March 4, 1969     B. BERNAS     3,430,804
DECOMPOSITION VESSEL
Filed Feb. 19, 1968
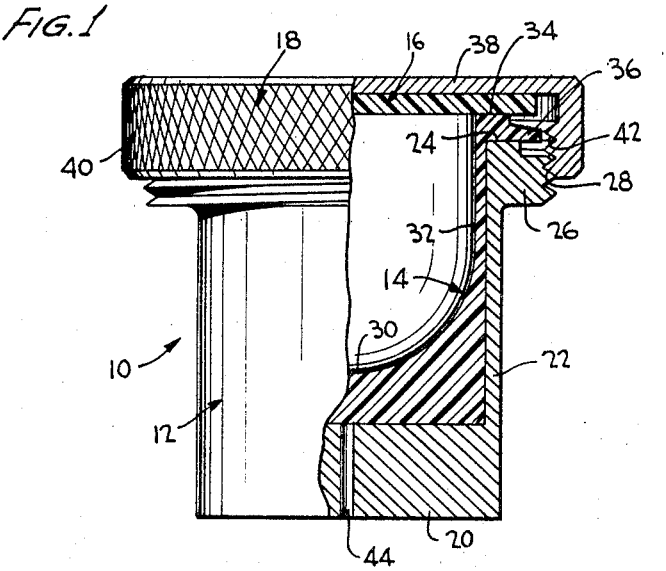
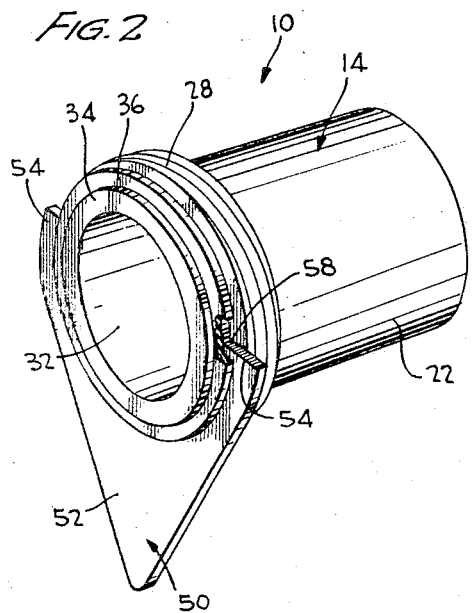
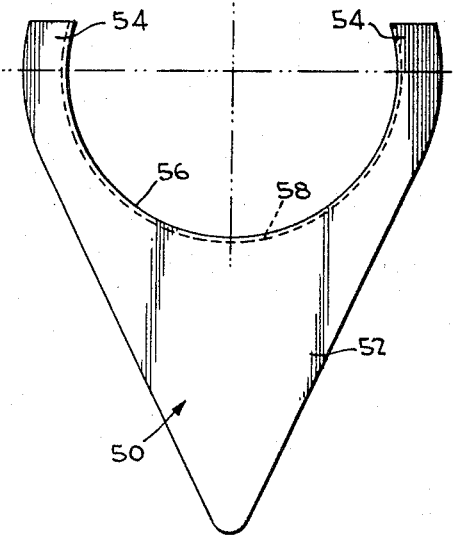
INVENTOR,
BEDRICH BERNAS
ATTORNEYS United States Patent Office 3,430,804
Patented Mar. 4, 1969

3,430,804
DECOMPOSITION VESSEL
Bedrich Bernas, 8531A Glenn Dale Road,
Greenbelt, Md. 20770
Filed Feb. 19, 1968, Ser. No. 706,543
U.S. Cl. 220—63          10 Claims
Int. Cl. B65d 25/14, 41/04, 53/06

ABSTRACT OF THE DISCLOSURE

Decomposition vessel particularly for use when a liquid- and vapor-tight seal is required. A supporting vessel surrounds a chemically resistant liner or bucket having an upstanding rim which sealingly engages a chemically resistant sealing disk held in place by a cap removably secured to the supporting member. Contact areas are minimized to maximize sealing pressure while support for the sealing engagement is provided by an outstanding flange on the bucket immediately below the rim.

---

This invention relates to a decomposition vessel and relates more particularly to a liquid- and vapor-tight container for use in various applications, for example, to permit simple and rapid decomposition of such materials as silicates and other refractory compounds by acids at relatively low temperatures.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Decomposition vessels have been known heretofore, although prior art constructions have generally been unsatisfactory in that they have not been capable of providing both liquid- and vapor-tight seals for extended periods under temperature conditions that may range from relatively low temperatures to relatively high temperatures. In the decomposition of silicates and other such refractory compounds by acids, relatively low temperatures are utilized. Various volatile constituents such as silica, iron, arsenic, mercury, zinc, cadmium, bismuth and lead ions may be produced as the result of the decomposition reaction and, for highly accurate analyses, such volatile constituents must not be lost. Additionally, if the decomposition vessel is formed of metal, possible losses occur due to chemical reduction of metal ions and their subsequent alloying. The reactants may include highly corrosive acids and such decomposition vessels must be resistant thereto to insure against contamination.

In order to preclude reaction between the chemical constituents and the material of the decomposition vessel, polytetrafluoroethylene (Teflon) liners and stoppers in stainless steel or the like "bombs" have been utilized. Generally, tapered areas of the container and tapered stoppers have been used and sealing has been effected by clamping the stoppers with individually adjustable screws. The dimensional instability of Teflon under the conditions of such use has resulted in the stoppers in such prior art constructions becoming loose after repeated use due to the enlargement of the socket in the body of the container. The machining of the sealing area or trimming off of extruding Teflon edges was therefore frequently necessary. Thus, the possibility of vapor leakage constituted an ever-present doubt as to the quantitativeness of the decomposition step. To date, there has been no decomposition vessel available which is capable of highly reliable vapor-proof applications for extended periods.

In general, sealing contact between the container or liner body and the stopper therefor have been relatively large in prior art constructions. However, since the sealing pressure resulting from a given force is indirectly proportional to the area of contact ($P=F/A$), it will be seen that it is highly desirable to minimize the sealing area thereby maximizing the sealing pressure for a given force. Of course, in order for a decomposition vessel or the like to be useable in a simple and highly efficient manner, it is important that the same be manually operable whereby the sealing force applied is limited. Therefore, in order to maximize the sealing pressure, the sealing area should be minimized. The instant inventive concepts provide a device in which a liquid- and vapor-tight seal can be provided with manually available sealing forces and without necessitating frequent re-machining or replacement of the sealing elements.

Thus, the basic objective of the instant invention is to provide a vapor-tight vessel for various applications including the decomposition of silicates or other refractory compounds by acids at relatively low temperatures, which vessel is highly reliable in use, sturdy and durable in construction, and relatively inexpensive to manufacture and maintain. In this regard, and considering the foregoing, the instant inventive concepts provide a dimensionally optimized sealing contact between a generally planar rim on a liner or bucket formed of Teflon or other chemically resistant material and a generally planar portion of a Teflon or other chemically resistant sealing disk.

Another important aspect of this invention is the provision of a construction wherein the sealing elements are properly supported without increasing the sealing areas by providing an offset flange spaced from the bucket rim which overlies a supporting ledge on an outer member formed of stainless steel or other suitable material.

Another feature of the instant invention is the provision of a bucket or liner for a decomposition vessel which is integral, dimensionally stable, relatively rigid and self-supporting throughout providing a smooth, continuous interior chamber free of cracks, fissures or other defects, for receiving the materials to be reacted. While there have been some prior art suggestions of using a highly flexible "bag" or the like as a liner to protect a container, such a construction would be undesirable in a decomposition vessel since portions of the reactants could be engaged in folds or wrinkles in such a "bag" thereby precluding quantitatively reliable decomposition.

It should be understood that although the device of the instant invention is particularly designed for use in simple and rapid decomposition of silicates and other refractory compounds by acids at relatively low temperatures, it could be readily utilized for any other chemical reactions and is both liquid- and vapor-tight over extreme temperature ranges. Additionally, although Teflon is utilized as the preferred material for the bucket or liner and the sealing disk, any suitable material which is chemically resistant to the reactants may be substituted therefor. Similarly, although the outer supporting member is preferably made of stainless steel, other suitable materials capable of providing sufficient mechanical support can be utilized in place thereof.

Other and further objects of the instant invention reside in the combination of elements, arrangement of parts and features of construction. Still other objects will in part be obvious and in part be pointed out as the description of the invention proceeds and as shown in the accompanying drawing wherein:

FIGURE 1 is a side view, partly in elevation and partly in cross-section, of a preferred construction for a decomposition vessel according to the instant invention;

FIGURE 2 is a perspective view of the decomposition vessel of FIGURE 1 with the cap removed therefrom and with a pouring spout, forming a further feature of the instant invention, engaged with the vessel to facilitate further processing steps in the quantitative analyses, parts being broken away and in cross-section for illustrative clarity; and FIGURE 3 is a plan view of the preferred pouring spout.

Like reference characters refer to like parts throughout the several views of the drawing.

Referring now to the drawing, a decomposition vessel according to a preferred construction is designated generally by the reference numeral 10 and comprises basically a supporting member 12, a bucket or liner therefor 14, a sealing disk 16 and a cap 18.

The supporting member 12 includes a bottom 20 and peripheral sidewalls 22 terminating in an upstanding ledge 24. Spaced immediately below the upstanding ledge 24 is an outstanding flange 26 having thread means 28 defined thereon.

The bucket 14 includes a bottom 30 and peripheral sides 32 terminating in an upstanding rim 34, preferably planar as shown in the drawing. Spaced immediately below the rim 34 is an outstanding flange 36 which overlies the ledge 24 and, which preferably extends beyond the ledge 24 to an extent less than the flange 26, for a purpose to be described in more detail hereinafter.

The sealing disk 16 is preferably merely a planar member which is dimensioned to completely overlie the rim 34 and extend therebeyond as seen particularly in FIGURE 1.

The cap 18 has a top 38 and a downwardly depending flange 40 including thread means 42 adapted to cooperate with the thread means 28 on the supporting member 12 for releasably securing the cap 18 to the supporting member 14.

The bucket 14 is preferably designed to removably fit within the supporting member 12 with the bottom 30 of the bucket supported by the bottom 20 of the supporting member and the sides 32 of the bucket supported by the sides 22 of the supporting member. A small vent hole 44 is provided in the bottom 20 of the supporting member 12 to preclude air resistance to insertion of the bucket thereby insuring intimate supporting contact between the interior of the supporting member and the exterior of the bucket. The flange 36 of the bucket, as indicated previously, includes portions which overlie the ledge 24 of the supporting member to provide good support for the rim 34 immediately adjacent the rim, but disposed slightly therebelow in order to minimize the area of the rim whereby the sealing pressure is maximized as explained previously.

The sealing disk 16 need not be secured to the cap 18, and preferably is separate therefrom whereby both the bucket 14 and the sealing disk 16 can be removed at will. The planar engagement of portions of the sealing disk 16 with the rim 34 of the bucket insures excellent sealing contact while precluding the possibility of enlargement of one of the sealing elements as would result if tapered sealing areas were provided as with prior art constructions.

The use and operation of the basic decomposition vessel will be readily understood. With the bucket 14 supported by the supporting member 12, the reactants may be placed in the bucket and the cap 18 threadably engaged with the supporting member 12 after the sealing disk 16 has been interposed between the top 38 of the cap 18 and the rim 34 of the bucket 14. Sufficient force may be provided with this construction by mere manual engagement of the thread means 28, 42 to provide a sealing pressure between the rim 34 of the bucket and the portions of the sealing disk 16 contacted thereby which will preclude liquid or vapor loss, even under relatively low or relatively high temperature conditions.

As indicated previously, an additional feature of the instant invention is the provision of a pouring spout 50 preferably formed of Teflon or other chemically resistant material. The pouring spout 50 has an elongated spout portion 52 and a pair of wing portions 54 which define an arcuate opening 56 slightly greater than half the circumferential extent of the peripheral sides of the supporting member 12, particularly that portion of the peripheral sides of the supporting member 12 immediately above the flange 26 and immediately below the ledge 24. The portions of the spout surrounding the opening 56 may be chamfered, if desired, as shown at 58. Due to the over-center arrangement, the wing portions 54 of the pouring spout 50 may be snappingly engaged with the peripheral sides of the supporting member between the ledge 26 and the outstanding flange 36 on the bucket 14. If desired, the space between the flange 36 on the bucket 14 and the flange 26 on the supporting member 12 may be correlated with the thickness of the pouring spout 50 to provide a press-fit relationship further securing the pouring spout in position. Thus, when the cap 18 has been removed from its threadable engagement with the supporting member 12, and even before the sealing disk 16 is removed from its engagement with the bucket 14, if desired, the pouring spout 50 may be secured in position. Then, by lifting the sealing disk 16, the contents of the bucket 14 may be poured therefrom for further processing while contacting only the chemically resistant material of the bucket 14 and the pouring spout 50.

Due to the nature of the construction of the decomposition vessel of the instant invention, the device may be used repeatedly with the assurance that the seal will remain both liquid- and vapor-tight. If necessary, the bucket and sealing disk may be readily replaced although this is generally not necessary for extended periods.

Once again, it should be emphasized that a relatively high sealing pressure can be provided by the construction of the instant invention due to the limited contact area between the rim 34 of the bucket 14 and the sealing disk 16. The slightly offset flange 36 permits the use of a rim 34 of limited extent, while providing good support for the rim from the ledge 24 of the supporting member 12.

Thus, it will now be seen that there is herein provided a decomposition vessel which satisfies all of the objects of the instant invention, and others, including many advantages of great practical utility and commercial importance.

Since many embodiments may be made of the instant inventive concepts, and since many modifications may be made of the embodiments hereinbefore shown and described, it is to be understood that the foregoing disclosure is to be interpreted as illustrative and not as limiting.

What is claimed is:

1. A decomposition vessel comprising a supporting member including an upstanding ledge surrounding an opening, a bucket formed of a material resistant to attack by the materials to be placed within said vessel, said bucket having a bottom, peripheral sides including portions dimensioned to fit within said opening, and an upstanding rim, a sealing disk formed of a material resistant to attack by the materials to be placed within said vessel, and a cap releasably secured to said supporting member outwardly of said ledge, said sealing disk including portions interposed between said cap and said rim, which portions are maintained in sealing engagement with said rim when said cap is secured to said supporting member, portions of said bucket spaced immediately beneath said rim extending outwardly of said rim and in overlying engagement with said ledge to increase the support for said rim while minimizing the sealing area between said rim and said portions of said sealing disk whereby the sealing pressure between said rim and said portions of said sealing disk is maximized.

2. The vessel of claim 1 wherein said bucket and said sealing disk are formed of polytetrafluoroethylene.

3. The vessel of claim 1 wherein said supporting member includes a bottom underlying said bottom of said bucket and peripheral sides surrounding said peripheral sides of said bucket, said bottom of said supporting member having portions which define a vent hole therethrough.

4. The vessel of claim 1 wherein said sealing area of said rim and said portions of said sealing disk are generally planar.

5. The vessel of claim 1 wherein said peripheral sides of said bucket and said rim are integral and relatively rigid, said peripheral sides of said bucket defining a smooth, continuous interior chamber sealed against vapor loss by said engagement between said rim and said portions of said sealing disk.

6. The vessel of claim 1 wherein said cap and said supporting member are threadably engaged.

7. The vessel of claim 1 wherein said supporting member includes a flange extending outwardly of said ledge, said flange having thread means thereon, and said cap includes a downwardly depending flange having thread means thereon adapted to cooperate with said thread means on said flange of said supporting member to releasably secure said cap to said supporting member.

8. The vessel of claim 7 wherein said flange on said supporting member is spaced below said ledge, said portions of said bucket spaced immediately beneath said rim defining a flange extending outwardly beyond said ledge to an extent less than said flange on said supporting member, said vessel further including, in combination, a pouring spout including portions engageable between said flange on said supporting member and said flange on said bucket when said cap has been removed from said supporting member.

9. A liquid- and vapor-tight decomposition vessel comprising a rigid, integral supporting member including a bottom, peripheral sides and an upstanding ledge surrounding an opening, a rigid, integral bucket formed of a material resistant to attack by the materials to be placed within said vessel, said bucket having a bottom, peripheral sides including portions dimensioned to fit within said opening, and an upstanding, generally planar, rim, said bottom and peripheral sides of said supporting member surroundingly engaging and supporting said bottom and peripheral sides of said bucket, a sealing disk formed of a material resistant to attack by the materials to be placed within said vessel, and a cap releasably secured to said supporting member outwardly of said ledge, said peripheral sides of said supporting member including a flange spaced below said ledge and extending outwardly of said ledge, said flange having thread means thereon, and said cap including a downwardly depending flange having thread means thereon adapted to cooperate with said thread means on said flange of said supporting member to releasably secure said cap to said supporting member, said sealing disk including generally planar portions interposed between said cap and said rim which portions are maintained in sealing engagement with said rim when said cap is secured to said supporting member, portions of said bucket spaced immediately beneath said rim extending outwardly of said rim and in overlying engagement with said ledge to increase the support for said rim while minimizing the sealing area between said rim and said portions of said sealing disk whereby the sealing pressure between said rim and said portions of said sealing disk is maximized.

10. The vessel of claim 9 wherein said portions of said bucket spaced immediately beneath said rim define a flange extending outwardly beyond said ledge to an extent less than said flange on said supporting member, said vessel further including, in combination, a pouring spout including wing portions engageable between said flange on said supporting member and said flange on said bucket when said cap has been removed from said supporting member, said peripheral sides of said supporting member and said peripheral sides of said bucket being generally cylindrical, and said wing portions of said pouring spout defining an arcuate opening slightly greater than half the circumferential extent of said peripheral sides of said supporting member whereby said wing portions of said pouring spout snappingly engage said peripheral sides of said supporting member between said flange on said supporting member and said flange on said bucket.

References Cited

UNITED STATES PATENTS

| | | | |
|---|---|---|---|
| 2,592,562 | 4/1952 | Haley | 220—65 |
| 3,144,167 | 8/1964 | Schultz | 220—63 |

GEORGE T. HALL, *Primary Examiner.*

U.S. Cl. X.R.

222—567